United States Patent
Kirigaya (10) Patent No.: US 8,224,398 B2
(45) Date of Patent: Jul. 17, 2012

(54) HANDS-FREE TELEPHONE CONVERSATION APPARATUS

(75) Inventor: Hideyuki Kirigaya, Kanagawa (JP)

(73) Assignee: Panasonic Corporation, Osaka (JP)

( * ) Notice: Subject to any disclaimer, the term of this patent is extended or adjusted under 35 U.S.C. 154(b) by 517 days.

(21) Appl. No.: 12/443,534

(22) PCT Filed: May 11, 2007

(86) PCT No.: PCT/JP2007/059741
§ 371 (c)(1),
(2), (4) Date: Apr. 30, 2009

(87) PCT Pub. No.: WO2008/041387
PCT Pub. Date: Apr. 10, 2008

(65) Prior Publication Data
US 2010/0113104 A1 May 6, 2010

(30) Foreign Application Priority Data
Oct. 2, 2006 (JP) ................................. 2006-270780

(51) Int. Cl.
*H04M 1/00* (2006.01)
(52) U.S. Cl. .................................. 455/569.2; 455/569.1
(58) Field of Classification Search ............... 455/569.1, 455/569.2
See application file for complete search history.

(56) References Cited

U.S. PATENT DOCUMENTS

| | | | |
|---|---|---|---|
| 5,381,460 A * | 1/1995 | Ohashi et al. ............... | 455/569.1 |
| 6,216,018 B1 | 4/2001 | Nakanishi et al. | |
| 6,275,580 B1 * | 8/2001 | Faraci et al. ............. | 379/388.01 |
| 6,983,170 B2 * | 1/2006 | Stulberger ................. | 455/556.1 |
| 7,206,406 B2 * | 4/2007 | Kitami et al. ................ | 379/419 |
| 2002/0052226 A1 * | 5/2002 | Yoshida ........................ | 455/569 |
| 2005/0190935 A1 * | 9/2005 | Sakamoto ..................... | 381/302 |
| 2005/0282671 A1 | 12/2005 | Emura et al. | |
| 2005/0286714 A1 | 12/2005 | Tokuda | |
| 2006/0023890 A1 * | 2/2006 | Kaminuma ..................... | 381/18 |
| 2006/0165242 A1 | 7/2006 | Miki et al. | |

(Continued)

FOREIGN PATENT DOCUMENTS

EP    1 415 859 A1    5/2004

(Continued)

OTHER PUBLICATIONS

International Search Report for PCT/JP2007/059741, Jun. 12, 2007.

(Continued)

*Primary Examiner* — Linh Nguyen
(74) *Attorney, Agent, or Firm* — RatnerPrestia (57) ABSTRACT

A hands-free telephone conversation apparatus can reduce negative influence of an echo on a sound to be transmitted to a far-end user without deteriorating the sound. When a MPU determines that a mobile phone receives an incoming call, and a user starts to talk on the mobile phone, in accordance with an operation of an input device connected to an in-vehicle bus line, a MPU controls the mobile phone to have the mobile phone output, to the DSP, a sound signal indicative of a sound to be transmitted to the far-end user, and to have a switch select a loudspeaker, installed in an vehicle without being directed to the microphone, as a loudspeaker for outputting a sound received from the far-end user.

5 Claims, 5 Drawing Sheets

U.S. PATENT DOCUMENTS

| | | | |
|---|---|---|---|
| 2006/0204021 A1 | 9/2006 | Okabayashi et al. | |
| 2007/0116298 A1* | 5/2007 | Holmi et al. | 381/86 |
| 2007/0178944 A1* | 8/2007 | Mitsuru et al. | 455/569.1 |
| 2007/0209656 A1* | 9/2007 | Lee | 126/369 |
| 2008/0085744 A1* | 4/2008 | Duarte | 455/569.2 |
| 2008/0107280 A1* | 5/2008 | Haulick et al. | 381/66 |
| 2010/0035663 A1* | 2/2010 | Haulick et al. | 455/569.2 |
| 2010/0041443 A1* | 2/2010 | Yokota | 455/569.2 |
| 2010/0233998 A1* | 9/2010 | Saito | 455/412.2 |

FOREIGN PATENT DOCUMENTS

| | | |
|---|---|---|
| JP | 62-193347 | 12/1987 |
| JP | 1-291559 A | 11/1989 |
| JP | 2-4349 | 1/1990 |
| JP | 2-241296 A | 9/1990 |
| JP | 3-083492 A | 4/1991 |
| JP | 06084500 U | 12/1994 |
| JP | 2001-119470 A | 4/2001 |
| JP | 2003-124850 A | 4/2003 |
| JP | 2003-264889 A | 9/2003 |
| JP | 2005-303973 A | 10/2005 |
| JP | 2006-033802 A | 2/2006 |
| JP | 2006119520 A | 5/2006 |
| JP | 2006-148548 A | 6/2006 |
| JP | 2006-203459 A | 8/2006 |
| JP | 2006-238254 A | 9/2006 |
| JP | 2006-253997 A | 9/2006 |
| JP | 2006-254476 A | 9/2006 |
| JP | 2006-2533997 A | 9/2006 |

OTHER PUBLICATIONS

European Search Report for Application No. EP 07 74 3176, Sep. 14, 2011, Panasonic Corporation.

* cited by examiner

HANDS-FREE TELEPHONE CONVERSATION APPARATUS

This Application is a U.S. National Phase Application of PCT International Application PCT/JP2007/059741.

TECHNICAL FIELD

The present invention relates to an in-vehicle hands-free telephone conversation apparatus.

BACKGROUND OF THE INVENTION

In a conventional hands-free telephone conversation apparatus, a sound received by a microphone installed in a vehicle is transmitted to the far-end user, and a sound from the far-end user is outputted from a loudspeaker installed in the vehicle. The sound outputted by the loudspeaker is received by the microphone as an echo when a user talks with a far-end user on a mobile phone without having the mobile phone in his/her hand. In order to cancel an echo by adding an echo cancellation signal, to a sound signal to be transmitted to the far-end user, generated through delay processing and level adjust processing, the conventional hands-free telephone conversation apparatus adjusts an operation condition of a sound processing unit for processing a sound signal to be transmitted to the far-end user and a sound signal received from the far-end user, on the basis of the volume of the sound signal to be transmitted to the far-end user, the volume of the sound signal received from the far-end user, the type of the vehicle, and the like (see for example Patent document 1).
Patent document 1: Japanese Patent Laid-Open Publication 2001-119470

DISCLOSURE OF THE INVENTION

Problems to be Solved by the Invention

The conventional hands-free telephone conversation apparatus however encounters such a problem that a sound to be transmitted to the far-end user is deteriorated as a result of the fact that an echo cancellation signal is added to a sound signal indicative of the sound.

It is therefore an object of the present invention to provide a hands-free telephone conversation apparatus which can reduce negative influence of an echo on a sound to be transmitted to a far-end user without deteriorating the sound.

Means for Solving the Problems

A hands-free telephone conversation apparatus according to the present invention, comprises: a microphone to be used when a user is talking on a mobile phone; a least one loudspeaker directed to the microphone, and adapted to output a sound; at least one loudspeaker installed without being directed to the microphone, and adapted to output a sound; loudspeaker selecting means for selecting at least one loudspeaker installed without being directed to the microphone, as a loudspeaker for outputting a sound received from a far-end user when the user is talking on the mobile phone.

The hands-free telephone conversation apparatus thus constructed can reduce negative influence of an echo on a sound to be transmitted to a far-end user without deteriorating the sound, by reason that sound signal processing necessary to cancel an echo is not performed in the hands-free telephone conversation apparatus, and a sound received from the far-end user is outputted from a loudspeaker installed without being directed to the microphone.

The hands-free telephone conversation apparatus according to the present invention may further comprise: test sound signal generating means for generating a test sound signal indicative of a test sound, the microphone having high input sensitivity to the test sound; loudspeaker switching means for switching from one loudspeaker to another in a predetermined sequence; and sound pressure level detecting means for detecting a sound pressure level of a test sound from a loudspeaker selected by the loudspeaker switching means, wherein the loudspeaker selecting means may select, on the basis of the sound pressure level detected by the sound pressure level detecting means, a loudspeaker as a loudspeaker for outputting a sound received from a far-end user.

The hands-free telephone conversation apparatus according to the present invention may further comprise a band pass filter for filtering sound signals received from the loudspeaker, wherein the loudspeaker selecting means may set filter coefficients to the band pass filter on the basis of the sound pressure level detected by the sound pressure level detecting means.

The hands-free telephone conversation apparatus thus constructed can set optimum filter coefficients to the band pass filter.

The above-mentioned loudspeaker selecting means may be constituted by an integrated circuit.

Advantageous Effect of the Invention

The present invention provides a hands-free telephone conversation apparatus which has an advantageous effect of reducing negative influence of an echo on a sound to be transmitted to a far-end user without deteriorating the sound.

EXPLANATION OF THE REFERENCE NUMERALS

1: hands-free telephone conversation apparatus
2: navigation device
3: in-vehicle audio device
4: in-vehicle bus line 5: mobile phone
10: MPU (micro processing unit)
11: microphone
12: DSP (digital signal processor)
13: switch
14a, 14b, 19a, 19b, 20a, and 20b: power amplifiers
15a, 15b, 21a, 21b, 22a, and 22b: loudspeakers
16: bus I/F circuit (bus interface circuit)
17a, 17b: HPF (high-pass filter)
18a, 18b: LPF (low-pass filter)

PREFERRED EMBODIMENT OF THE
INVENTION

One preferred embodiment of a hands-free telephone conversation apparatus according to the present invention will be described hereinafter with reference to accompanying drawings.

Figure 1:
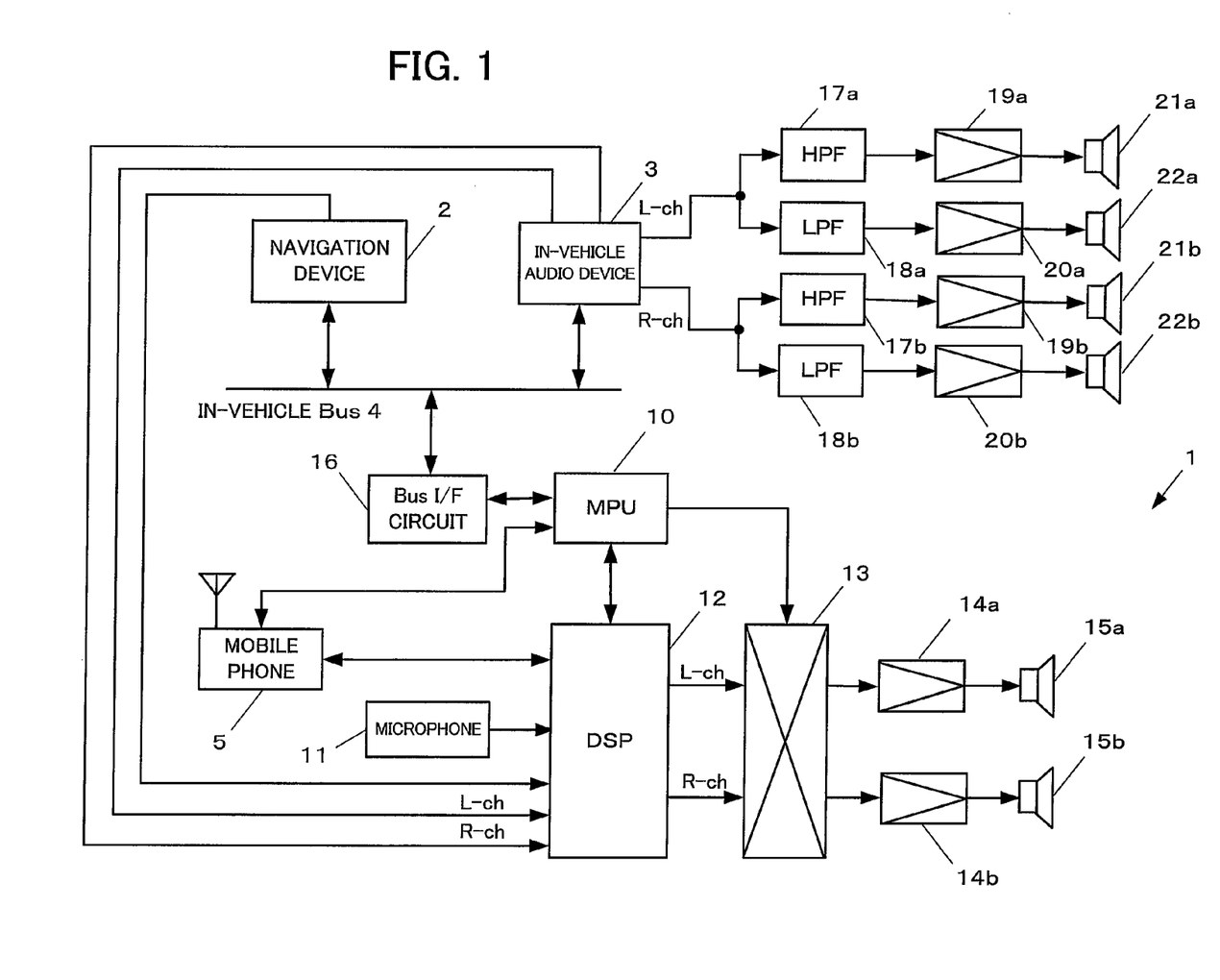
FIG. 1 is a block diagram showing a hands-free telephone conversation apparatus according to one preferred embodiment of the present invention.

As shown in FIG. 1, the hands-free telephone conversation apparatus 1 is electrically connected to a navigation device 2 and an in-vehicle audio device 3 through an in-vehicle bus line 4, and electrically connected to a mobile phone 5.

The hands-free telephone conversation apparatus 1 includes a micro processing unit (MPU) 10, a microphone 11, a digital signal processor (DSP) 12, a switch 13, power amplifiers 14a and 14b, center loudspeakers 15a and 15b, and a bus I/F circuit 16.

The MPU 10 executes a program stored in a read only memory (ROM, not shown) or the like to control each part of the hands-free telephone conversation apparatus 1. In this embodiment, the MPU 10 functions as loudspeaker selecting means and loudspeaker switching means of the hands-free telephone conversation apparatus 1 according to the present invention.

The microphone 11 functions as a device for inputting a sound into the mobile phone 5 when a user is talking on the mobile phone 5 without having the mobile phone 5 with his/her hand.

The DSP 12 is programmed to perform signal level adjusting processing, delay time adjusting processing, and signal combining processing and the like to process sound signals received from the mobile phone 5, the microphone 11 and the like. In this embodiment, the DSP 12 functions as test sound signal generating means and sound pressure level detecting means of the hands-free telephone conversation apparatus 1 according to the present invention. The DSP 12 functions as a band-pass filter for outputting band-limited sound signals (pass band: 300 Hz to 4 kHz) by filtering sound signals received from the navigation device, the in-vehicle audio device, and the mobile phone. The DSP 12 may change the pass band of each of the band-limited sound signals to be filtered from the sound signals received from the navigation device, the in-vehicle audio device, and the mobile phone.

The switch 13 outputs a received sound signal to a selected device in response to a selection signal from the MPU 10.

The power amplifiers 14a and 14b amplifies the respective sound signals from the switch 13.

The center loudspeaker 15a is installed in the vehicle without being directed toward the microphone 11. The center loudspeaker 15b is installed in the vehicle, and directed toward the microphone 11. It is preferred that each of the center loudspeakers 15a and 15b have narrow directional characteristics. The center loudspeakers 15a and 15b output sounds represented by the sound signals amplified by the power amplifiers 14a and 14b, respectively.

The bus I/F circuit 16 is electrically connected to the in-vehicle bus line 4. As a result, the MPU 10 is electrically connected to the navigation device 2 and the in-vehicle audio device 3.

The navigation device 2 outputs a sound signal indicating a sound to guide a driver to a designated destination through an optimum route.

The in-vehicle audio device 3 outputs sound signals indicating music or the like. The in-vehicle audio device 3 is electrically connected to high-pass filters (HPFs) 17a and 17b for filtering sound signals to output its high frequency components larger than or equal in frequency to 4 kHz, and electrically connected to low-pass filters (LPFs) 18a and 18b for filtering sound signals to output its low frequency components smaller than or equal in frequency to 300 Hz.

The sound signals passed through the HPFs 17a and 17b and the LPFs 18a and 18b are amplified by the respective power amplifiers 19a, 19b, 20a, and 20b, while sounds represented by the sound signals amplified by the respective power amplifiers 19a, 19b, 20a, and 20b are outputted from in-vehicle loudspeakers 21a, 21b, 22a, and 22b.

And more specifically, the DSP 12 processes a sound signal from the mobile phone 5, a sound signal from the navigation device 2, and sound signals from the in-vehicle audio device 3, and outputs the processed sound signals to the loudspeakers 15a and 15b through the switch 13 and the amplifiers 14a and 14b.

Figure 2:
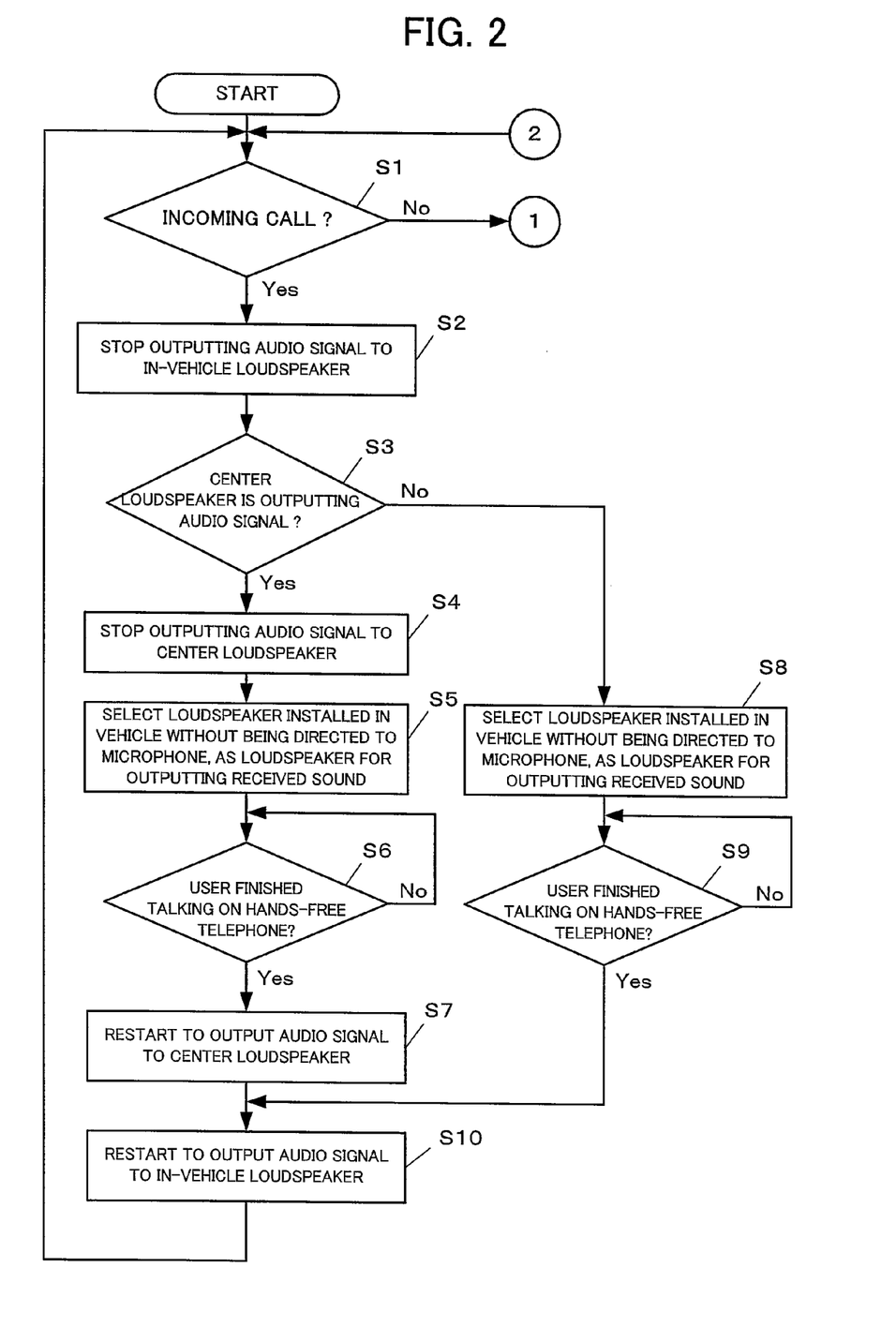
FIG. 2 is a flow chart explaining an operation of a hands-free telephone conversation apparatus according to one preferred embodiment of the present invention.
Figure 3:
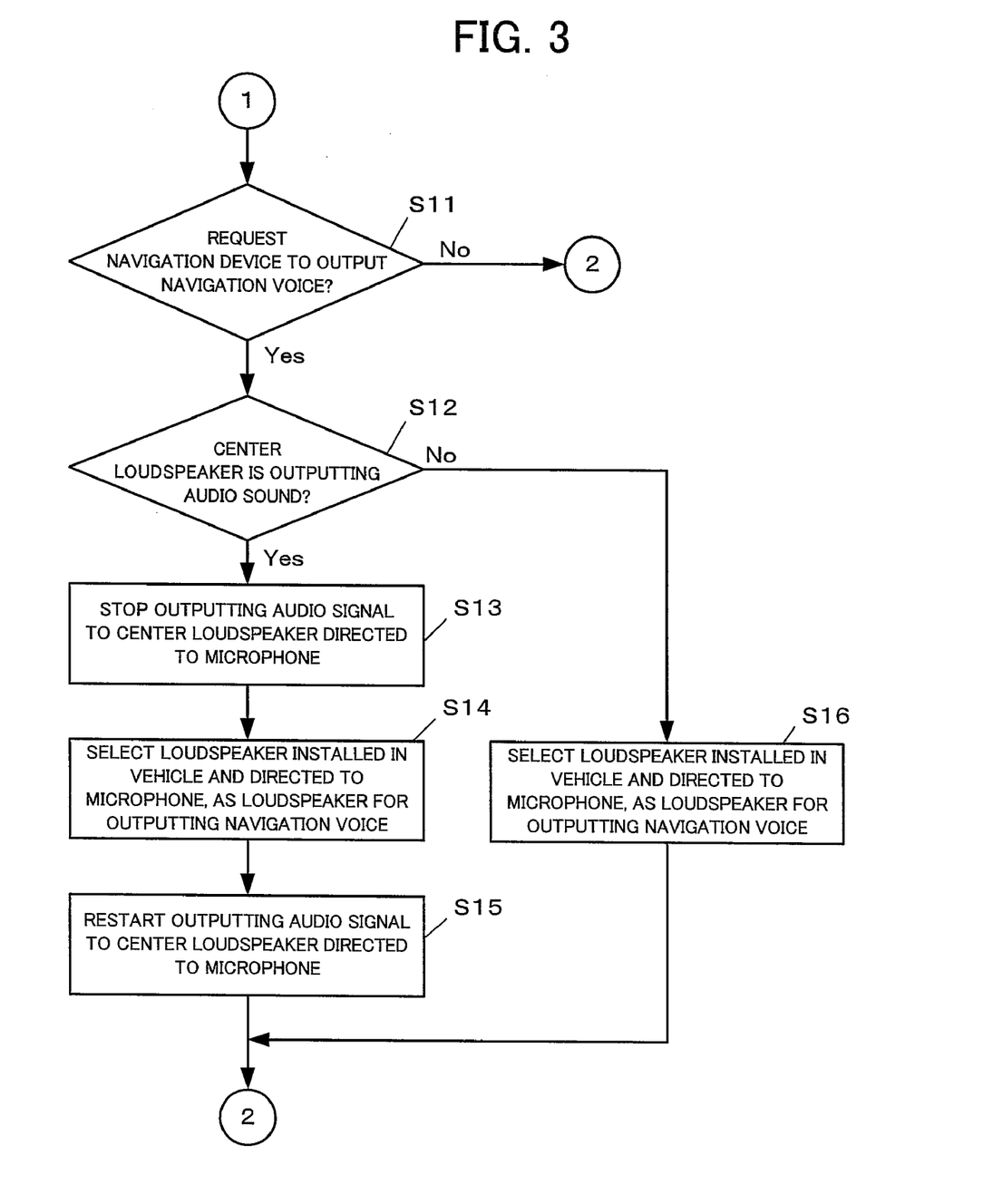
FIG. 3 is a flow chart explaining an operation continued from the operation explained in FIG. 2.

FIGS. 2 and 3 are flowcharts showing an operation of the hands-free telephone conversation apparatus 1 according to the preferred embodiment of the present invention. Firstly, the MPU 10 determines whether or not the mobile phone 5 is receiving an incoming call (in step S1). When the determination is made that the mobile phone 5 is not receiving an incoming call, the MPU 10 proceeds to step S11 which will be described hereinafter.

When the determination is made that the mobile phone 5 is receiving an incoming call, the MPU 10 determines whether or not the in-vehicle audio device 3 is outputting sound signals to the center loudspeakers 15a and 15b (in step S3). When the mobile phone 5 has received an incoming call, the in-vehicle audio device 3 stops outputting sound signals to the in-vehicle loudspeakers 21a, 21b, 22a, and 22b (in step S2).

When the determination is made that the center loudspeakers 15a and 15b are outputting sound signals, the MPU 10 controls the switches 13 to prevent the sound signals from being outputted to the in-vehicle loudspeakers 15a and 15b (in step S4).

Then, the MPU 10 has the center loudspeakers 15a and 15b output ring tone stored in a read only memory (RAM, not shown). When the user starts to talk on the mobile phone 5 without having the mobile phone 5 with his/her hand by operating an input device (not shown) connected to the in-vehicle bus line 4, the MPU 10 controls the mobile phone 5 to have the mobile phone 5 output, to the DSP 12, sound signal received from the far-end user. In order to reduce negative influence of an echo on a sound to be transmitted to a far-end user, the MPU 10 selects the loudspeaker 15a as a loudspeaker for outputting the sound received from the far-end user (in step S5), and controls the switch 13 to ensure that the DSP 12 is electrically connected to the power amplifier 14a.

Then, the MPU 10 determines whether or not the user has finished a hands-free phone call (in step S6). When the determination is made that the user has finished a hands-free phone call, the MPU 10 has the switch 13 restart outputting the sound signals to the center loudspeakers 15a and 15b (in step S7).

When the determination is made in step S3 that the audio sounds are not outputted from the center loudspeakers 15*a* and 15*b*, the MPU 10 reduces negative influence of an echo on a sound to be transmitted to a far-end user by selecting the loudspeaker 15*a* as a loudspeaker for outputting the sound received from the far-end user (in step S8), and controls the switch 13 to ensure that the DSP 12 is electrically connected to the power amplifier 14*a*.

Then, the MPU 10 determines whether or not the user has finished a hands-free phone call (in step S9). When the determination is made that the user has finished a hands-free phone call, the MPU 10 proceeds to step S10 which will be described hereinafter.

The in-vehicle audio device 3 restarts to output the sound signals to the in-vehicle loudspeakers 21*a*, 21*b*, 22*a*, and 22*b*. The MPU 10 of the hands-free telephone conversation apparatus 1 proceeds to step S1.

Then, the MPU 10 determines whether or not a request signal has been received from the navigation device 2 through the Bus I/F circuit 16 (in step S11). When the determination is made that the request signal has been received from the navigation device 2, the MPU 10 of the hands-free telephone conversation apparatus 1 proceeds to step S1

When the determination is made that the user requests the navigation device 2 to output a navigation voice to guide a driver to a designated destination through an optimum route, the MPU 10 determines whether or not the center loudspeakers 15*a* and 15*b* are outputting audio sounds (in step S12).

When the determination is made that the center loudspeakers 15*a* and 15*b* are outputting audio sounds, the MPU 10 controls the switches 13 to have the switches 13 stop outputting the audio signal to the center loudspeaker 15*a* (in step S13).

Then, the MPU 10 enhances the clarity of the navigation voice by selecting the loudspeaker 15*b* as a loudspeaker for outputting the navigation voice (in step S14), and controls the switch 13 to ensure that the DSP 12 is electrically connected to the power amplifier 14*b* through the switch 13.

Then, the MPU 10 controls the switch 13 to have the switch 13 restart to output the audio signal to the center loudspeaker 15*b* (in step S15), and returns to the step S1 of the operation of the hands-free telephone conversation apparatus 1.

When the determination is made that the center loudspeakers 15*a* and 15*b* are not outputting audio sounds in the step S12, the MPU 10 enhances the clarity of the navigation voice by selecting the loudspeaker 15*b* as a loudspeaker for outputting the navigation voice (in step S16), and returns to the step S1 of the operation of the hands-free telephone conversation apparatus 1.

The relationship between frequency characteristics of the microphone and a sound pressure level of sounds transferred to the microphone from the loudspeakers, when the user is talking on a hands-free telephone conversation apparatus, will be then described hereinafter with reference to FIG. 4.

Figure 4:
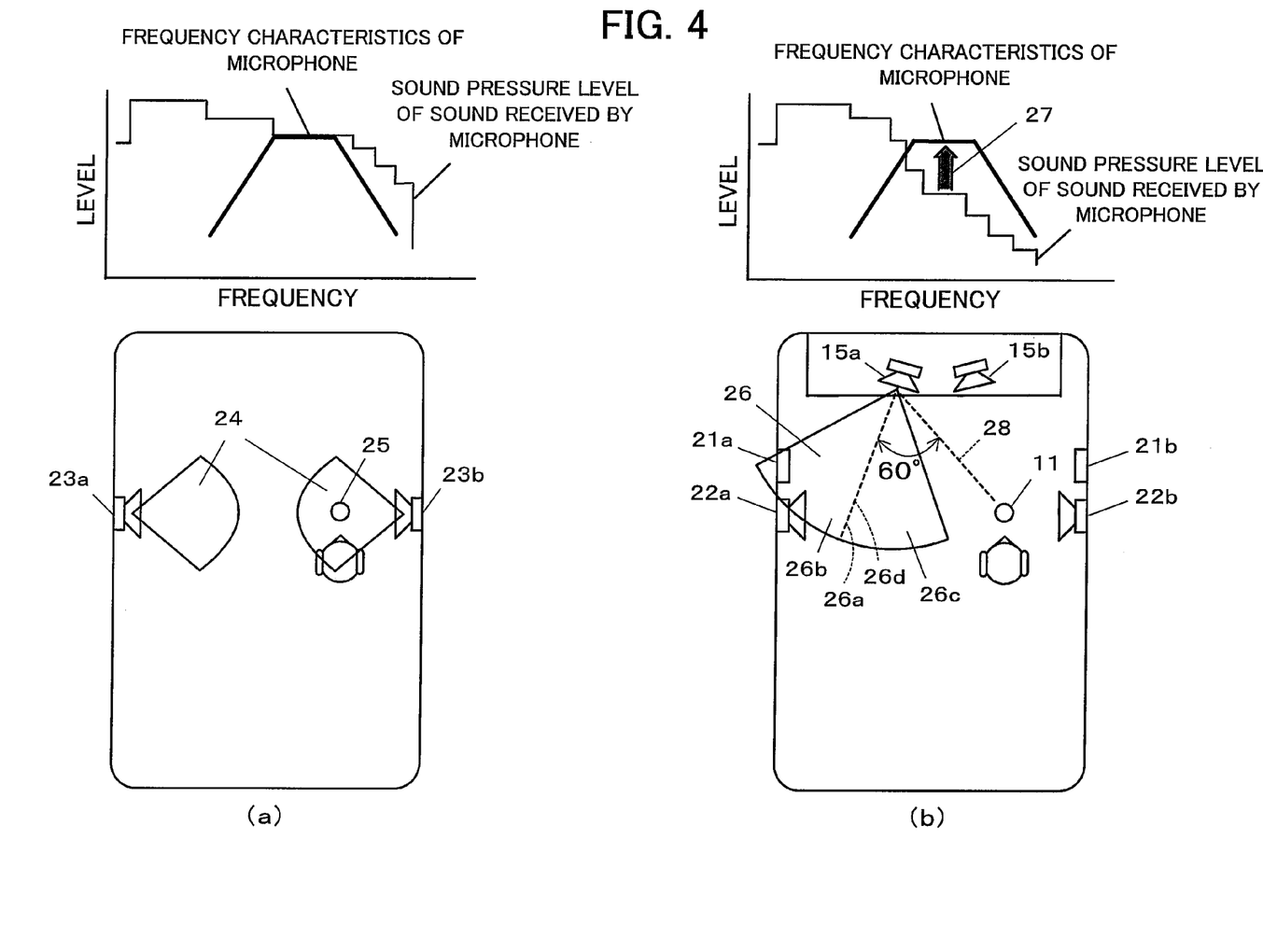
FIG. 4 is schematic views explaining a relation between frequency characteristics of a microphone of the conventional hands-free telephone conversation apparatus and a sound pressure level of a sound received by a microphone when the user is on the phone, and a relation between frequency characteristics of a microphone of the hands-free telephone conversation apparatus according to one preferred embodiment of the present invention and a sound pressure level of a sound received by a microphone when the user is on the phone.

In the conventional hands-free telephone conversation apparatus, a microphone 25 is located in a reproduction area 24 of loudspeakers 23*a* and 23*b* as shown in FIG. 4(*a*). When the user is talking on the hands-free telephone conversation apparatus, the loudspeakers 23*a* and 23*b* output a sound in a direction of the reproduction area 24. In this case, a sound received by the microphone 25 is heavily influenced by an echo, by reason that the sound pressure level of the sound transferred to the microphone 25 from the loudspeakers 23*a* and 23*b* is increased under the condition that the microphone 25 has high sensitivity to specific frequency components of the sound.

On the other hand, in the hands-free telephone conversation apparatus 1 as shown in FIG. 4(*b*), a direction in which the loudspeaker 15*a* output a sound, i.e., the direction of the loudspeaker 15*a* is oriented at an angle of 60 degrees with respect to a direction from the loudspeaker 15*a* to the microphone 11. Therefore, the microphone 11 is not in the reproduction area 26 of the loudspeaker 15*a*. Here, the loudspeakers 21*a*, 21*b*, 22*a*, and 22*b* do not output sounds when the user talks on the hands-free telephone conversation apparatus 1 without having the hands-free telephone conversation apparatus 1 in his/her hand (see step S2).

In this case, the sound pressure level of the sound transferred from the loudspeaker 15*a* to the microphone 11 is low, even if the microphone 11 has high input sensitivity to the sound, in comparison with the conventional hands-free telephone conversation apparatus. Therefore, the hands-free telephone conversation apparatus 1 according to the embodiment of the present invention can reduce negative influence of an echo on a sound to be transmitted to a far-end user by sound pressure difference shown by an arrow 27.

Therefore, it is preferable to orient the loudspeaker 15*a* at an angle equal to or larger than 60 degrees with respect to a direction from the loudspeaker 15*a* to the microphone 11.

The hands-free telephone conversation apparatus 1 according to the embodiment of the present invention can reduce negative influence of an echo on a sound to be transmitted to a far-end user without deteriorating the sound, by reason that the hands-free telephone conversation apparatus does not perform sound signal processing necessary to cancel an echo, and the center loudspeaker 15*a* installed in the vehicle without being directed toward the microphone 11 outputs a sound received from the far-end user when the user is talking on the hands-free telephone conversation apparatus without having the hands-free telephone conversation apparatus in his/her hand.

In this embodiment, the hands-free telephone conversation apparatus 1 has been explained as having two center loudspeakers 15*a* and 15*b*. However, the hands-free telephone conversation apparatus 1 may have three or more center loudspeakers.

In this embodiment, the center loudspeaker 15*a* has been explained as a loudspeaker for outputting a sound from the mobile phone. A loudspeaker selected on the basis of a following loudspeaker selecting processing may output a sound from the mobile phone.

Figure 5:
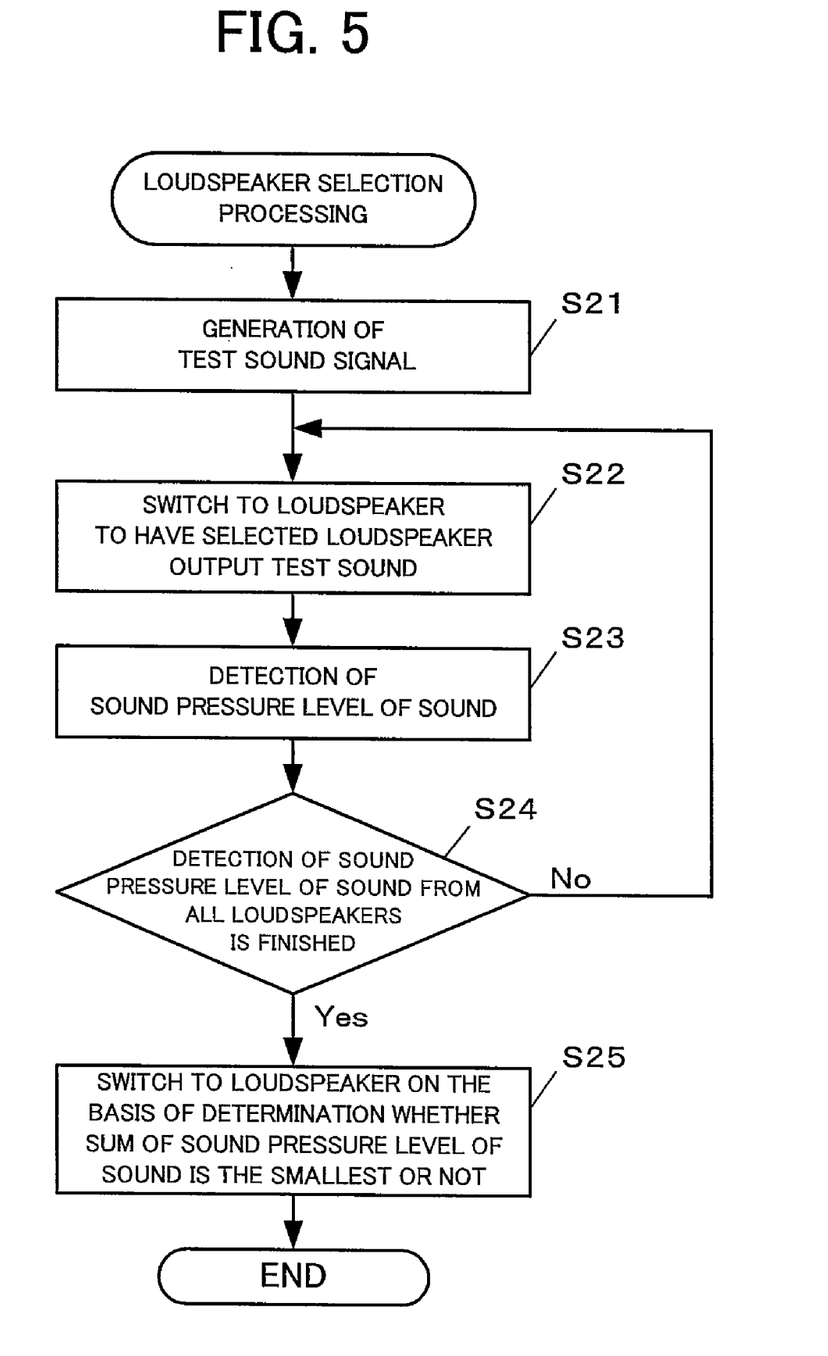
FIG. 5 is a flow chart showing a loudspeaker selecting processing of the hands-free telephone conversation apparatus according to one preferred embodiment of the present invention.

FIG. 15 is a flow chart showing a loudspeaker selecting processing of the hands-free telephone conversation apparatus 1 according to the preferred embodiment of the present invention.

Firstly, the DSP 12 generates, on the basis of test sound data previously stored in the ROM, three test sound signals different in frequency from one another (in step S21). The microphone 11 has high sensitivity to a test sound represented by the test sound signals.

In order to have the loudspeakers selectively output a test sound to be represented by the test sound signals generated by the DSP 12, the MPU 10 switches to each of the loudspeakers (in step S22).

Then, the test sound are outputted by the loudspeaker selected by the MPU 10, while the DSP 12 detects the sound pressure level of the test sound outputted to the microphone 11 from the selected loudspeaker (in step S23).

Then, the MPU 10 determines whether or not the sound pressure level of the test sound from all of the loudspeakers is detected by the DSP 12 (in step S24). When the MPU 10 determines that the DSP 12 does not finish the detection of the sound pressure level of the test sound from the selected loudspeaker, the MPU 10 returns to step S22 of the operation of the hands-free telephone conversation apparatus.

When, on the other hand, the determination is made that the sound pressure level of the test sound from each of the loudspeakers has been detected, the MPU 10 selects a loudspeaker to ensure that the sum of the sound pressure levels of the test sound signals from the selected loudspeaker is the smallest value (in step S25).

In this embodiment, three test sound signals are generated in step S21 under the condition that the microphone 11 has high sensitivity to three test sound signals generated in step S21. However, one or more test sound signals may be generated under the condition that the microphone 11 has high sensitivity to one or more test sound signals.

In this embodiment, the MPU 10 selects a loudspeaker to ensure that the sum of the sound pressure levels of the test sound signals from the selected loudspeaker is the smallest value in comparison with those of other loudspeakers (in step S25). However, the MPU 10 may select at least one loudspeaker to ensure that the sum of the sound pressure levels of the test sound signals from the selected loudspeaker is smaller than a predetermined threshold level (in step S25).

The DSP 12 may generate a test sound signal, detect a sound pressure level of a sound received by the microphone 11, and set filter coefficients of a band pass filter on the basis of the detected sound pressure level through a processing similar to the loudspeaker selecting processing.

In this embodiment, the navigation device 2 and the in-vehicle audio device 3 are electrically connected to the in-vehicle bus line 4. Further, an in-vehicle device of an electronic toll collection (ETC) system, an in-vehicle device of a vehicle information and communication system (VICS), and the like may be electrically connected to the in-vehicle bus line 4.

The MPU 10, the DSP 12, the switch 13, and the bus I/F circuit 16 may be collectively constituted by an integrated circuit.

The reproduction area 26 is constituted by two areas 26*b* and 26*c* symmetrical or substantially symmetrical with respect to the axis 26*a* of the loudspeaker 15*a*. The axis 26*a* is oriented at an angle equal to or larger than 60 degrees with respect to a direction 28 from the loudspeaker 15*a* to the microphone 11 located near a steering wheel (not shown).

INDUSTRIAL APPLICABILITY

Therefore, the hands-free telephone conversation apparatus has an advantageous effect of reducing negative influence of an echo on a sound to be transmitted to a far-end user without deteriorating the sound, and is useful for an in-vehicle hands-free telephone conversation apparatus.

The invention claimed is:

1. A vehicle having a function to allow a user to talk on a mobile phone, comprising:
    a microphone for receiving a sound to be transmitted to a far-end user of said mobile phone, and
    a loudspeaker for outputting sound received from said far-end user, wherein
    said microphone is located outside of a reproduction area in which said sound is outputted by said loudspeaker;
    a further loudspeaker, said microphone within a further reproduction area of said further loudspeaker, and
    loudspeaker selecting means for
        when said user is not talking on said mobile phone:
            selecting said loudspeaker to output sound and selecting said further loudspeaker to output sound
        when said user is talking on said mobile phone:
            selecting said loudspeaker to output sound and preventing said further loudspeaker from outputting sound.

2. A vehicle according to claim 1, wherein
    said reproduction area is constituted by two areas substantially symmetrical with respect to an axis,
    said axis is oriented at an angle equal to or larger than 60 degrees with respect to a direction from said loudspeaker to said microphone.

3. A vehicle according to claim 1, wherein said hands-free telephone conversation apparatus is located near a steering wheel.

4. A vehicle according to claim 1, further comprising:
    means for outputting a test sound through each of a plurality of loudspeakers which includes a loudspeaker and a further loudspeaker;
    means for detecting a sound pressure level of said test sound from each of said loudspeakers; and
    means for selecting, on the basis of said sound pressure level, one of said loudspeakers as a loudspeaker for outputting sound received from said far-end user.

5. A vehicle according to claim 4, further comprising:
    means for setting filter coefficients to a band pass filter for filtering a sound to be outputted from each of said loudspeakers to said microphone.

* * * * *